United States Patent
Rossignol et al.

(10) Patent No.: US 8,594,199 B2
(45) Date of Patent: Nov. 26, 2013

(54) APPARATUS AND METHOD FOR MOTION VECTOR FILTERING BASED ON LOCAL IMAGE SEGMENTATION AND LATTICE MAPS

(75) Inventors: Francois Rossignol, Montreal (CA); Thi Thuy-Ha Tran, Montreal (CA); Chon Tam Ledinh, Montreal (CA)

(73) Assignee: QUALCOMM Incorporated, San Diego, CA (US)

( * ) Notice: Subject to any disclaimer, the term of this patent is extended or adjusted under 35 U.S.C. 154(b) by 924 days.

(21) Appl. No.: 12/719,785

(22) Filed: Mar. 8, 2010

(65) Prior Publication Data

US 2011/0216831 A1    Sep. 8, 2011

(51) Int. Cl.
H04N 7/12        (2006.01)
H04N 11/02       (2006.01)
H04N 11/04       (2006.01)

(52) U.S. Cl.
USPC .................................................. 375/240.16

(58) Field of Classification Search
CPC .............. H04N 7/26824; H04N 7/26888
USPC ................................................... 375/240.16
See application file for complete search history.

(56) References Cited

U.S. PATENT DOCUMENTS

| | | | | |
|---|---|---|---|---|
| 4,764,971 A * | 8/1988 | Sullivan | ........................ | 382/173 |
| 5,034,986 A * | 7/1991 | Karmann et al. | ............. | 382/103 |
| 5,148,269 A | 9/1992 | de Haan et al. | | |
| 7,120,277 B2 * | 10/2006 | Pelagotti et al. | .............. | 382/107 |
| 7,447,337 B2 * | 11/2008 | Zhang et al. | .................. | 382/107 |
| 7,978,770 B2 * | 7/2011 | Luo et al. | ................... | 375/240.16 |
| 8,134,603 B2 * | 3/2012 | Auberger et al. | ........... | 348/208.3 |
| 8,467,453 B2 * | 6/2013 | Wu et al. | ................... | 375/240.16 |
| 2003/0035583 A1 * | 2/2003 | Pelagotti et al. | .............. | 382/217 |
| 2005/0025342 A1 * | 2/2005 | Lee et al. | ....................... | 382/107 |
| 2005/0041842 A1 * | 2/2005 | Frakes et al. | .................. | 382/128 |
| 2005/0195278 A1 * | 9/2005 | Nair | ............................. | 348/143 |
| 2006/0018382 A1 * | 1/2006 | Shi et al. | ................... | 375/240.16 |
| 2006/0029275 A1 * | 2/2006 | Li et al. | .......................... | 382/173 |
| 2006/0072664 A1 * | 4/2006 | Kwon et al. | ............. | 375/240.16 |
| 2008/0247465 A1 * | 10/2008 | Xin et al. | ................... | 375/240.16 |
| 2009/0161763 A1 | 6/2009 | Rossignol et al. | | |
| 2009/0232216 A1 * | 9/2009 | Kurata | ...................... | 375/240.16 |
| 2010/0008423 A1 * | 1/2010 | Namboodiri et al. | ..... | 375/240.16 |
| 2010/0034446 A1 * | 2/2010 | Zhu et al. | ..................... | 382/130 |
| 2010/0329343 A1 * | 12/2010 | Wu et al. | ................... | 375/240.16 |

* cited by examiner

*Primary Examiner* — Mehrdad Dsatouri
*Assistant Examiner* — Jeremaiah C Hallenbeck-Huber
(74) *Attorney, Agent, or Firm* — Haynes and Boone, LLP (57) ABSTRACT

A method and an apparatus for filtering motion vector fields provided by a motion estimator apparatus are disclosed. The method includes receiving an input image, determining a motion vector field associated with the input image, determining a local segmentation image, forming a lattice map to identify periodic structures, using the local segmentation image and the lattice map to obtain an image segment pixel count and an image/motion segment pixel count, and using the segment pixel count and the image/motion segment pixel count to provide a filtered motion vector field. Some embodiments further include a motion estimation apparatus including an image delay apparatus, a lattice detector to find lattice structures in the input and delayed images, a histogram generator and a histogram analyzer to provide a set of horizontal and vertical search masks, a motion vector estimator to provide a motion vector field, and a motion vector filter as provided herein.

23 Claims, 6 Drawing Sheets

APPARATUS AND METHOD FOR MOTION VECTOR FILTERING BASED ON LOCAL IMAGE SEGMENTATION AND LATTICE MAPS

BACKGROUND

1. Field of the Invention

This invention relates to the fields of video compression and motion-compensated image interpolation for frame-rate conversion, and, more particularly, to an apparatus and methods for filtering motion vectors provided by block-based motion estimation (ME) apparatuses and methods.

2. Description of Related Art

Many image and video processing apparatuses and methods, such as motion-compensated image interpolation, rely on estimated motion vectors. Typically these motion vectors are block-based, in which a motion vector represents a rectangular group of pixels. In some apparatuses and methods, such as image interpolation, it is important that these motion vectors be 'true', that is substantially free of any errors, so as not to produce any processing artifacts in the output results. Motion estimation (ME) methods using exhaustive full-search block-matching techniques are prone to errors in the motion vector fields. These errors may come from different types of content in a source and are nearly impossible to eliminate without applying some extra processing steps on the motion vector fields. Looking at the motion vector field as a signed intensity image, errors can be easily detected as outliers, meaning a motion vector value is different than most of the neighboring blocks' motion vector values. Motion Vector Filtering (MVF) may remove these outliers and provide a smoother, more consistent motion vector field. Some outliers are more isolated and easier to detect and filter out than others. Some motion vector errors can occur in groups where all neighboring motion vectors are similar, but all erroneous. The classic example of when this may occur is in areas of periodic structures, also referred to as lattice structures. For example, a lattice structure having a period of 8 pixels and also a true motion of 8 pixels may easily be estimated as having a motion of 0, causing "breaking" artifacts in an image interpolation scheme. These regions within the motion vector field are harder to filter out since the errors show up as clusters, making them harder to detect as errors.

U.S. Pat. No. 5,148,269 describes a device in which a small group of coarse (block-based) motion vectors is filtered to produce a finer motion vector, using the median value of an input subset. The center block is first partitioned into 4 sub-blocks. For each sub-block, a median value of the center block's motion vector component value and the same component values of the two blocks neighboring the sub-block is determined. The median value is assigned to the sub-block if a couple of simple criteria are met. The operation is then repeated until a motion vector is assigned to each pixel. This method was intended to reduce the dirty window effect, in which block-based motion vectors were used directly to generate the interpolated image. The method also has a smoothing effect on the motion vector field and provides the ability to remove isolated motion vectors. However, the method is "blind" as it operates on a set of motion vectors without verifying the quality of the replacement vector (by using error metrics that are commonly used in motion estimation, block-matching algorithms). The method also lacks the use of the source image as a guide for locating object boundaries, or the use of any information with regard to periodic structures that may be present.

What is needed is a method and an apparatus to replace erroneous motion vectors in a motion estimation apparatus that may have been detected as isolated from its neighbors or as a small outlier group, and may appear to be erroneous on a closer analysis.

SUMMARY

A method of filtering a motion vector field provided by a motion estimation apparatus is disclosed. The method includes receiving an input image and a delayed image, determining a motion vector field associated with the input image, determining a local segmentation image, forming a lattice map to identify periodic structures in the image, using the local segmentation image and the lattice map to obtain an image segment pixel count and an image/motion segment pixel count, and using the segment pixel count and the image/motion segment pixel count to provide a filtered motion vector field. Some embodiments of the present invention further include a motion estimation apparatus including an image delay apparatus to provide a delayed image from an input image, a lattice detector to find lattice structures in the input image and the delayed image and provide a lattice map, a histogram generator and a histogram analyzer to provide a set of horizontal and vertical search masks, a motion vector estimator to provide a motion vector field based on the input image, the delayed image, the lattice structures and a masked motion vector field based in the horizontal and vertical search masks, and a motion vector filter. The motion vector filter further including a low pass filter and down-sampler to provide a local segmentation image from the input image, a first shape adaptive window generator to provide an image bitmap from the local segmentation image, a map combiner to provide an image segment pixel count and a motion/image segment pixel count using the image bitmap and the lattice map, a second shape adaptive window generator to provide a motion vector based bitmap, an outlier detector to provide a binary map, a local mean calculator to provide a mean value to replace a motion vector, and a deciding stage to determine whether or not to replace a motion vector with a mean value using the binary map.

These and other embodiments of the present invention are further described below with reference to the following Drawings.

BRIEF DESCRIPTION OF THE DRAWINGS

Wherever possible, the same reference numbers are used throughout the drawings to refer to the same or like elements.

DETAILED DESCRIPTION

Many apparatuses and methods have been developed to filter motion vector fields using different approaches. In some apparatuses, a ME apparatus may not use a motion vector filter. Either the filtering or smoothing effect is intrinsic to the ME or a minor internal filtering operation takes place in the ME such as temporal loop filtering. These methods may access error calculations from the block matching process; thus a set of candidate motion vectors may be 'checked' or tested prior to a selection. However, these steps are computationally extensive and may overload the computational capabilities of the apparatus for large and complex image frames. Some embodiments of the invention as is further described below relate to an apparatus and methods of motion vector filtering which are independent of the ME apparatus itself, and operate as a stand-alone post-processing apparatus. Further, some embodiments of the invention may not require computationally extensive error calculations such as a sum of absolute differences (SAD), a sum of squared differences (SSD), or a sum of absolute transform differences (SAID).

In accordance with some embodiments of the present invention, a motion vector filtering apparatus and method that rely on source images and periodic structure maps or lattice maps as guides to determine the output motion vectors are provided. The source image is filtered and down sampled to align with a motion vector field using a local segmentation image. A first shape adaptive window is used for local object segmentation to identify object boundaries. A second shape adaptive window is used for segmenting the motion vector field for identifying potential outliers. Both types of shape-adaptive bitmaps are combined to determine a replacement motion vector component value to replace erroneous outlier motion vector components. The apparatus and method may be provided with horizontal and vertical periodic structure lattice maps, which locate lattice structures within the image frame. After an erroneous motion vector is detected as an outlier, it is then replaced. The replacement vector is obtained by a local mean calculation within an M×N block area. Here, M and N will be regarded as integer numbers between 1 and the total number of pixels in the vertical (M) or horizontal (N) direction in the image frame. If a lattice structure is present, the detection settings and replacement vector calculations are configured accordingly so as to remove errors in the motion vector field introduced by the lattice structure.

A block-based motion vector field can be post-processed using the corresponding source image as a guide to indicate where object boundaries are located and to which object a block-based motion vector is most-likely associated. Furthermore, horizontal and vertical period maps can be used as guides to help identify periodic structures, for which motion vectors may be filtered differently. In some embodiments of the present invention, erroneous motion vectors within a small percentage of motion vectors that appear to be erroneous in an M×N set of motion vectors, can be replaced. The replacement vector can be computed based on the M×N set of block-based motion vectors, the source image, and a lattice map. Although the median may not be used, the replacement vector calculation can be adjusted so that the resulting vector components resemble one of the existing vector components within the M×N set. Thus, in some embodiments the apparatus or method avoids generating new motion vector components that may contribute to worsen artifacts in an interpolated image scheme. In some embodiments, no error metric computation is used so the apparatus or method can still be considered 'blind,' although the computation may be well guided and computationally friendly.

Figure 1:
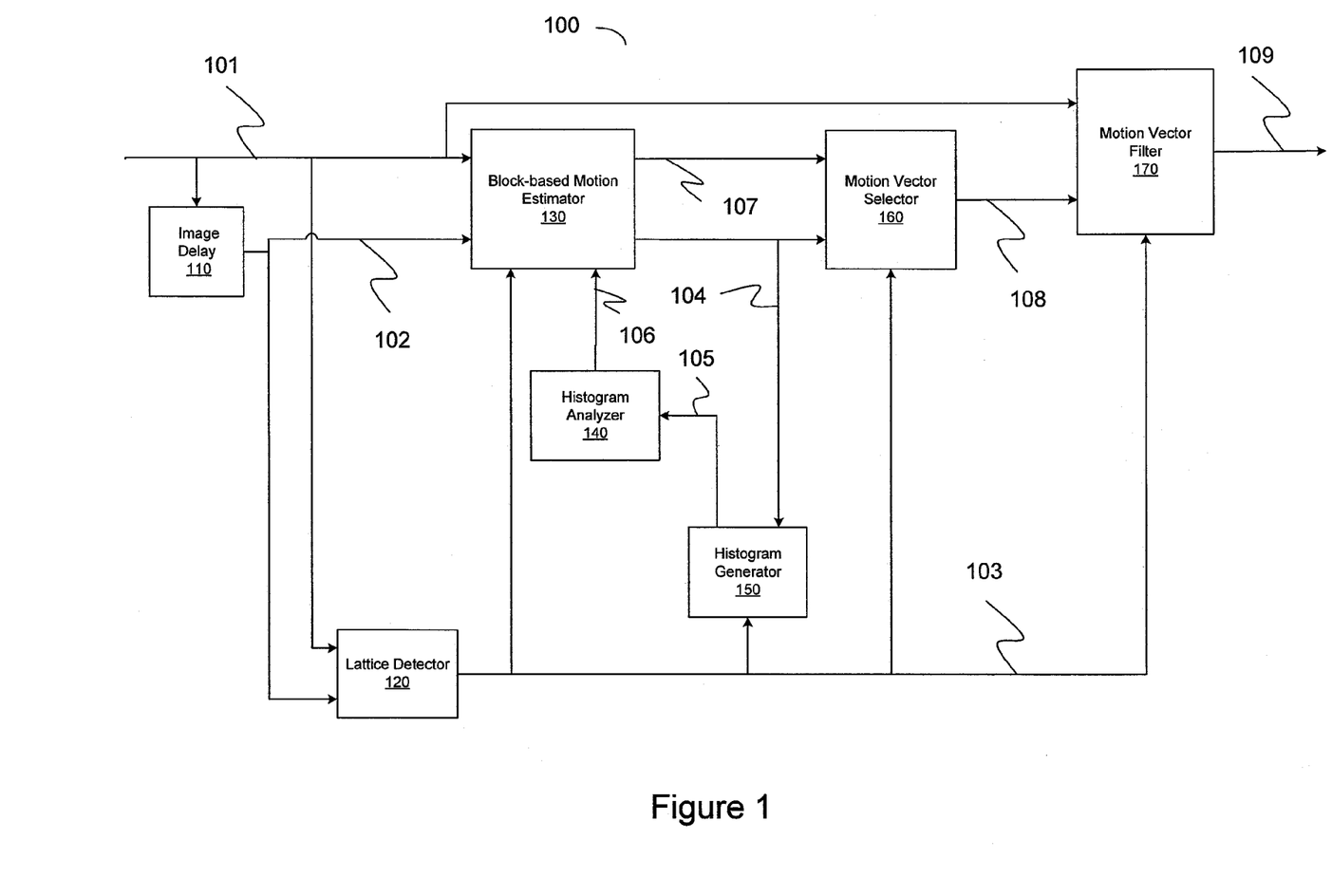
FIG. 1 illustrates a top-level block diagram of a Motion Estimation apparatus, consistent with some embodiments of the present invention.

FIG. 1 illustrates a top-level block diagram of an ME apparatus 100 that shows how some embodiments of the present invention may be integrated. Motion estimator apparatus 100 may be part of a video encoding apparatus or a frame rate conversion apparatus. For example, in some embodiments motion vector filter 170 is located at the end of ME 100 and may use an original input luminance image 101, a motion vector field 108, and horizontal and vertical lattice maps 103, provided by ME apparatus 100. A set of filtered motion vectors 109, produced by motion vector filter 170, can then be used for video encoding or motion-compensated image interpolation. A more in-depth description of some embodiments of the motion estimation apparatus and method can be found in U.S. patent application Ser. No. 12/338,960, incorporated herein by reference in its entirety. As shown in FIG. 1, current input luminance image 101 is input to image delay 110, which delays image 101 for one period to provide a previous luminance image 102. Images 101 and 102 are input to block-based motion estimator 130 and to lattice detector 120. Initially, block-based motion estimator 130 generates full exhaustive search motion vector field 104, which is input to motion vector selector 160 and histogram generator 150.

Lattice detector 120 generates a set of lattice maps 103 that are provided to motion estimator 130, histogram generator 150, motion vector selector 160, and motion vector filter 170. Some embodiments of lattice detector 120 may include a sampling window unit that can be coupled to receive an input image such as image 101 or delayed image 102. According to some embodiments of lattice detector 120, the sampling window unit may include a normalized one-dimensional sampling window and the sampling window can depend on the pitch period range that can be detected. In some exemplary embodiments, for a period range of [2 to K], a sampling window size of at least 2K pixels can be used. In some embodiments, lattice detector 120 may further include a weighting unit coupled to receive pixel samples and to implement a weighting function in order to obtain weighted pixel samples, and further provide the weighted pixel samples to a Fast Fourier Transform (FFT) unit. The FFT unit may be configured to perform a Fourier transform to obtain transform coefficients that may include the magnitude components of the coefficients and provide the coefficients to a peak and period computation unit (PPCU) that implements a peak detection scheme to detect the strongest frequency amplitude peaks. The PPCU can convert the best peak values into a pitch period map and provide the pitch period map to a filter period unit (FPU). The FPU can be configured to use the pitch period map and generate a lattice structure map, or lattice structure period map, which is a map of periodic structures within the input image. Lattice detector 120 may provide a map of periodic structures within images 101 and 102, together with the 'pitch' or pixel period of each periodic structure detected.

Histogram generator 150 generates a histogram 105 that is sent to histogram analyzer 140, which generates a set of horizontal and vertical search masks 106 from histogram 105. In some embodiments of the present invention, histogram 105 may also be referred to as motion vector histogram (MVH). In some embodiments of the present invention, histogram 105 may be a two-dimensional histogram in which a horizontal axis may represent motion vector displacements in a given direction (e.g. the horizontal direction or the vertical direction) and the vertical axis can represent horizontal pitch period values as detected by lattice detector 120. The bins in histogram 105 then represent the number of motion vectors having a displacement that may be associated with a lattice structure having a given pitch. In some exemplary embodiments of the present invention, a horizontal axis in an MVH for an M×N block area can represent all possible horizontal motion values within the block, namely [−N/2 to N/2], and the vertical axis in an MVH can represent all possible horizontal pitch period values [from 2 to N]. If an M×N block has a lattice structure that includes a detected horizontal pitch period of 4 in some pixel blocks and 5 in other pixel blocks, then an MVH for this block may contain high bin counts for horizontal components of motion vectors separated by an amount of 4 and 5, indicating a possibility that some of those motion vectors may be erroneous. In some embodiments of the present invention, the analysis of MVH 105 is performed by histogram analyzer 140.

Histogram analyzer 140 evaluates the contents of histogram 105 to determine which lattice structures provided by lattice detector 120 may correspond to true periodic structures in images 101 and 102, further providing search mask 106. In some embodiments of the present invention, there may be one or more search masks 106 associated with one or more horizontal lattice structures, and one or more search masks 106 associated with one or more vertical lattice structures. Horizontal and vertical search masks 106 are input to motion estimator block 130. At the next frame, motion estimator block 130 can use masks 106 to generate a second motion vector field 107 that, along with full-search motion vector field 104, is provided to motion vector selector 160. The masked search area provided by masks 106 is a subset of the search area and may not add to the complexity of the full-search ME. Motion vector field 107 may also be referred to as a 'masked motion vector field'. Motion vector selector 160 uses period information from lattice maps 103 to select between the two fields 104 and 107. The selected motion vectors 108 are then sent, along with input image 101 and lattice maps 103, to Motion Vector Filter 170, which performs the filtering operation on motion vectors 108 to produce a set of filtered motion vectors 109.

Some embodiments of ME apparatus 100 may be part of a computer, further comprising a set of commands to be executed by a processing unit included in the computer to perform operations on data structures stored in a memory, also included in the computer. According to some embodiments, the processing unit has the capability to receive input image 101 as a data file, and provide a set of filtered motion vectors 109 also as a data file. Some embodiments of ME apparatus 100 may also include a processor circuit controlled by firmware to operate the data structures involved in the different blocks illustrated in FIG. 1 and perform the operations described for each of the blocks. Some embodiments of ME apparatus 100 may include a dedicated circuit that performs all the operations described for each of the blocks in FIG. 1 in a single unit specifically designed for performing a task involved in providing a set of filtered motion vectors 109 from a motion vector field obtained from a video stream including a series of input images 101. Further, some embodiments of ME apparatus 100 may include a combination of commands or software executed by a computer having a memory and a processor, one or more processing circuits controlled by firmware, and one or more dedicated circuits performing a specific task within one or more of the blocks described in FIG. 1.

Figure 2:
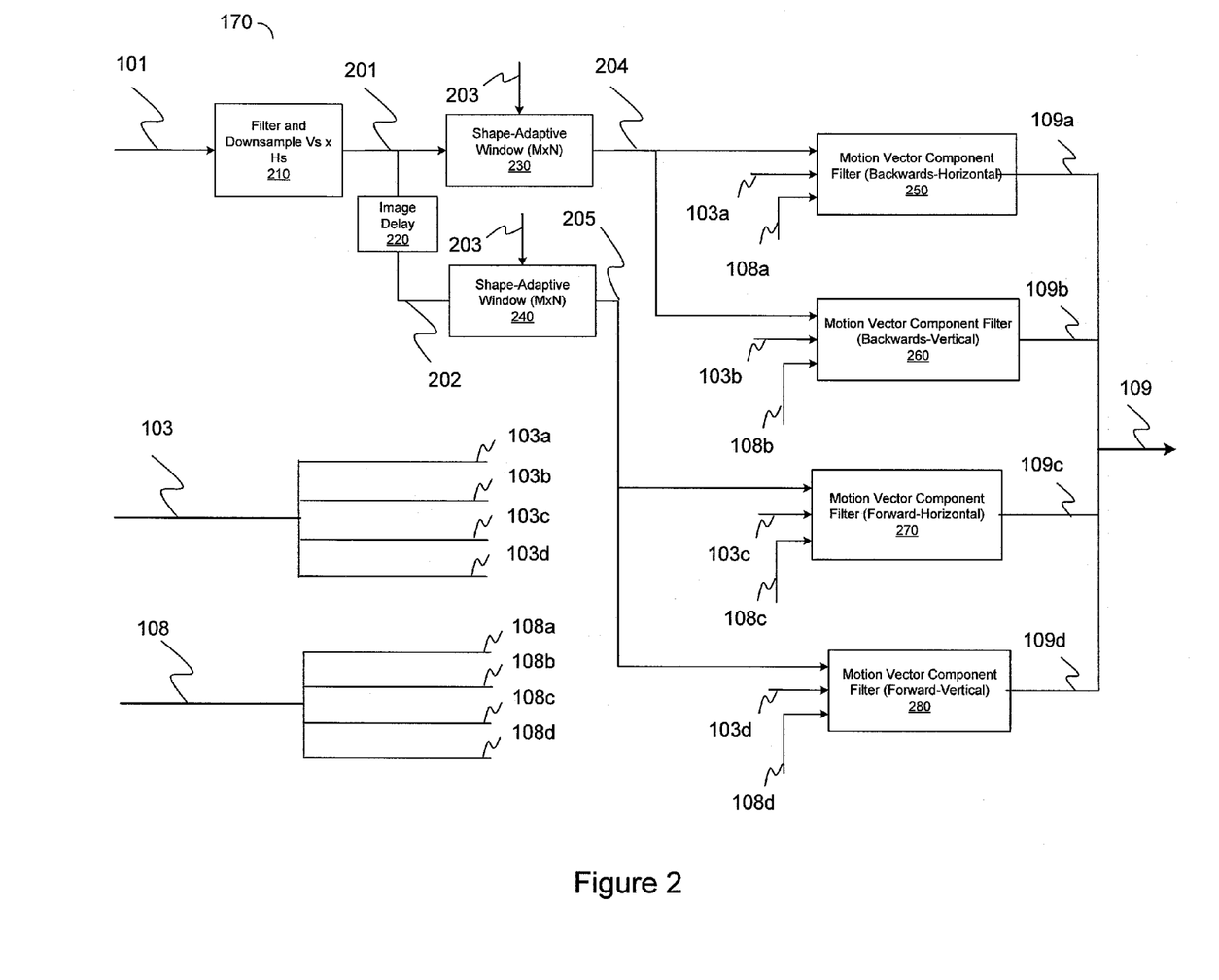
FIG. 2 illustrates a top-level block diagram of a motion vector filter, consistent with some embodiments of the present invention.

FIG. 2 illustrates a top-level block diagram of motion vector filter 170 according to some embodiments of the present invention. As shown in FIG. 2, original input image 101 is input to filter and down-sample apparatus 210, where the image may be low-pass filtered and down-sampled by 'Hs' pixels horizontally and 'Vs' pixels vertically, forming down-sampled image 201. The block size used for motion estimation may therefore have 'Vs' vertical pixels by 'Hs' horizontal pixels. Down-sampled image 201 may have the same resolution as that of input motion vector field 108, as well as that of input lattice maps 103. In the embodiment shown in FIG. 2, motion vector field 108 can include four sets, two sets having horizontal components (108a, 108c) and two sets having vertical components (108b, 108d). The labeling of the components as 'horizontal' or 'vertical' is arbitrary; in general, some embodiments of the present invention may use any set of two components substantially orthogonal to one another.

Motion estimator apparatus 100, according to the embodiment illustrated in FIG. 2, may provide two sets of motion vectors for the backward (108a and 108b) and forward (108c and 108d) directions. Image 101 may be associated with input luminance image Y[n], and delayed image 102 may be associated with input luminance image Y[n−1]. Then, motion vectors associated to delayed image 102—input luminance image Y[n−1]-, may indicate the forward motion of a block of pixels towards current image 101—input luminance image Y[n]-. Correspondingly, motion vectors associated with image 101—input luminance image Y[n]—may indicate the backward motion orientation of a block of pixels towards image 102—input luminance image Y[n−1]-. Thus, in some embodiments of the present invention the backward motion vectors may form a 'time-reversed' projection of the forward motion vectors. In some exemplary embodiments of ME apparatus 100, input image 101 may include a block of pixels depicting a car moving along a road in a given direction. In such situation, motion vectors associated with the block of pixels depicting the car in input image 101 may point in the forward direction of motion of the car, while motion vectors associated with the block of pixels depicting the car in delayed image 102 may point in the backward direction of motion of the car; that is, substantially opposite to the motion vectors associated with the same block of pixels in image 101.

Each of the four vector sets (108a-108d) may be filtered individually by motion vector filter 170. Lattice maps 103, which indicate for each block whether or not a lattice structure is associated with a block's location, may include four lattice maps 103a-103d, one for each motion vector component: Backwards-Horizontal (103a), Backwards-Vertical (103b), Forward-Horizontal (103c), and Forward-Vertical (103d). Maps 103a and 103b are generated from luminance image Y[n−1] —associated with delayed image 102—and maps 103c and 103d from luminance image Y[n] —associated with image 101—and are aligned to the motion vector components 108a-108d.

Down-sampled luminance image 201 may be used as a guide for filtering the backward motion vectors (corresponding to luminance image Y[n]) and a delayed version of image 201, image 202, may be used as a guide for filtering the forward motion vectors (corresponding to luminance image Y[n−1]). Images 201 and 202 are input to shape-adaptive window generators 230 and 240, respectively, which use threshold 203 to generate M×N image bitmaps 204 and 205 for each down-sampled pixel (or each block, if we are aligning blocks to motion vectors). Shape adaptive window generator 230 is discussed below with respect to FIG. 3. Image bitmap 204 and lattice map 103a are used to filter motion vector component 108a in filter 250, yielding filtered motion vector component 109a. Image bitmap 204 and lattice map 103b are used to filter motion vector component 108b in filter 260, yielding filtered motion vector component 109b. Image bitmap 205 and lattice map 103c are used to filter motion vector component 108c in filter 270, yielding filtered motion vector component 109c. Image bitmap 205 and lattice map 103d are used to filter motion vector component 108d in filter 280, yielding filtered motion vector component 109d. Motion vector components 109a to 109d are then grouped as motion vector filter output 109. Motion vector filtering is discussed in more detail below with respect to FIGS. 4-6.

Figure 3:
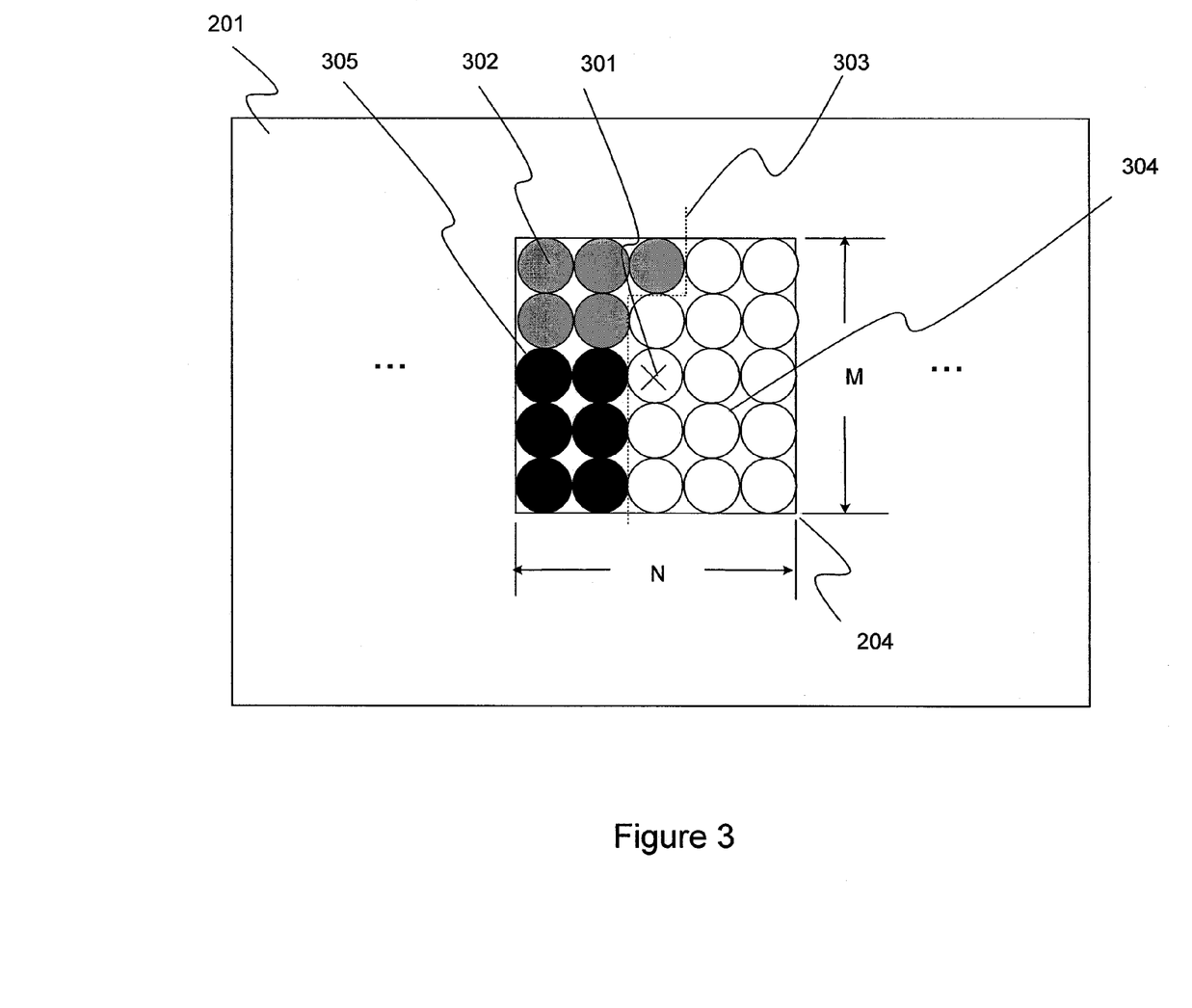
FIG. 3 is a schematic illustration of an M×N shape-adaptive window within an image, consistent with some embodiments of the present invention.

FIG. 3 is a schematic illustration of shape-adaptive window generator 230. According to some embodiments of the present invention illustrated in FIG. 3, shape-adaptive window generator 230 may provide an M×N shape-adaptive window 204 within down-sampled image 201. A center pixel 301 of window 230 is denoted with an 'x'. While numbers M and N may be any integer numbers between 1 and the total number of pixels in the vertical (M) or horizontal (N) direction in the image frame. As discussed above, in some embodiments of the present invention M and N may have odd values, such as 5×5 as shown in FIG. 3. All pixels of M×N window 204 will be compared to center pixel 301, starting with pixel 302, using an absolute difference calculation (AD). For each of the M×N pixels, the resulting AD's are compared to threshold 203 (cf. FIG. 2), generating M×N image bitmap 204. The AD metric can be utilized with both unsigned values (image intensity) and signed values (motion vector components). When the image intensity is used to evaluate the AD for each pixel, the resulting M×N array 204 is referred to as an image bitmap. When the motion vector component is used to evaluate the AD for each pixel, the resulting M×N array is referred to as a motion vector bitmap 402 (cf. FIG. 4). The image bitmap 204 associated with a center pixel describes regions of the image that contain homogeneous illumination pixels within an M×N set of pixels, relative to the center pixel. The motion bitmap 402 associated with a center pixel describes regions of the image that contain homogeneous motion pixels within an M×N set of pixels, relative to the center pixel (cf. FIG. 4).

Figure 4:
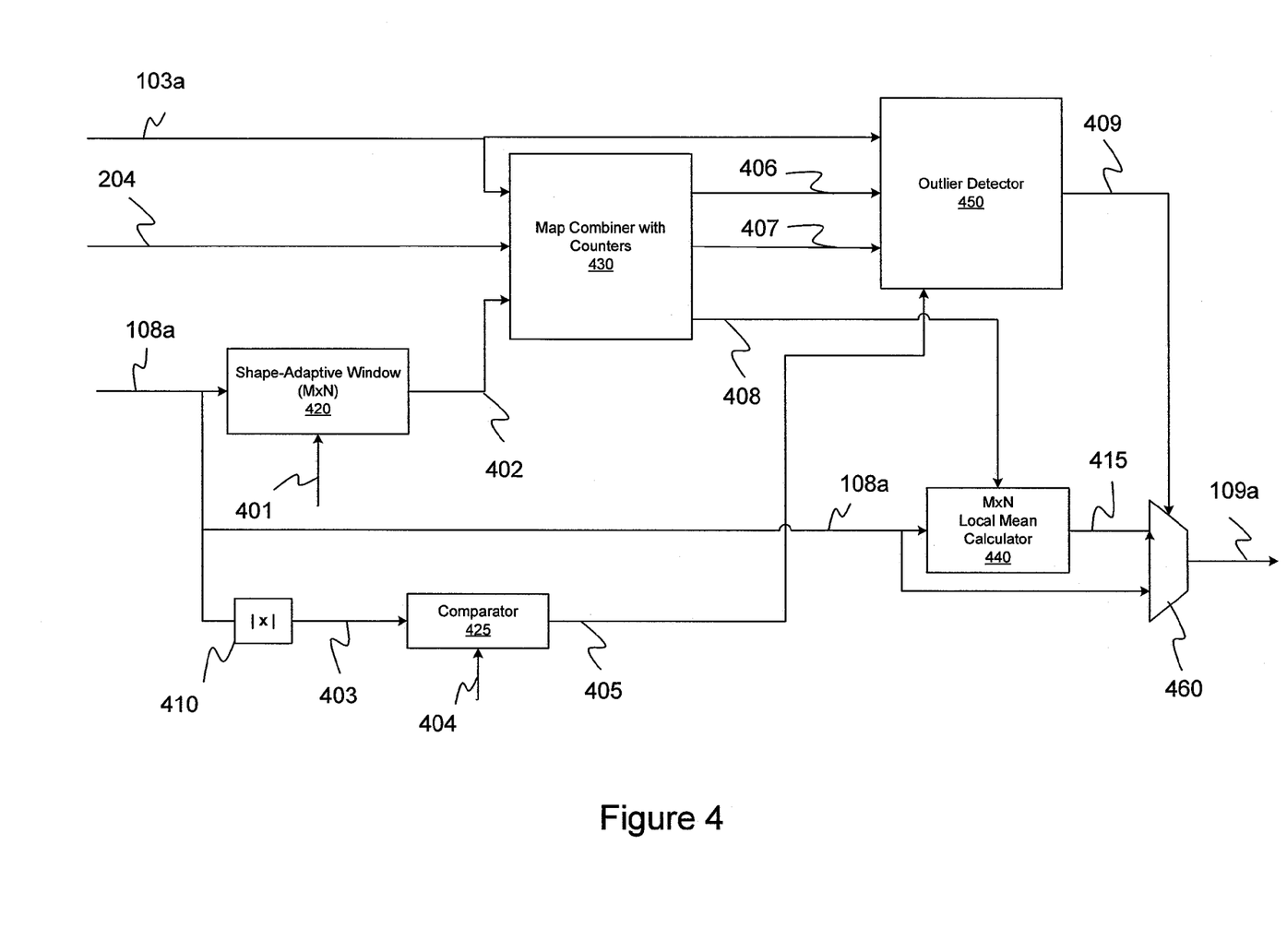
FIG. 4 illustrates a block diagram of a core motion vector filtering operation, consistent with some embodiments of the present invention.

In some embodiments of the present invention an image bitmap 204 describes shapes or portions of shapes associated with a center pixel, and the motion bitmap for the same pixel 402 describes the movement of those shapes or portions of shapes. According to some embodiments of the present invention, image bitmap 204 and motion bitmap 402 associated with a given pixel may not be the same, indicating that the pixel in question may be part of a lattice structure or an artifact in the motion vector field for the pixel in question.

If a pixel's AD is below threshold 203, the pixel is considered to be similar to the center pixel and can also be considered as part of the same object or region. In some embodiments of the present invention, threshold 203 may be referred to as an 'image segmentation' threshold. In the embodiment depicted in FIG. 3, all white pixels to the right of region line 303 along with center pixel 301 are part of homogenous region 304 and will have a '1' in the bitmap, all other pixels in region 305 will have a '0' in the bitmap. How the regions are segmented depends on the threshold. For example, if we increase the threshold, the grey pixels could become part of the homogeneous region. The window is of a sliding type, meaning that each pixel of image 201 will be at the center of the M×N window once. Thus, an M×N image bitmap 204 may be provided for each pixel in image 201.

FIG. 4 illustrates a block diagram of the core operations performed in motion vector filters 250, 260, 270, and 280 applied to individual components of motion vector fields 108a-108d (cf. FIG. 2). Motion vector component 108a enters shape adaptive window generator 420 for local segmentation. Threshold 401 adjusts the level of similarity between neighboring motion vectors and M×N image bitmap 402 is generated. According to some embodiments of the present invention, shape adaptive window generator 420 may operate in the same fashion as shape adaptive window generator 230 illustrated in FIG. 3. In some embodiments of the present invention, threshold 401 may be referred to as a 'motion segmentation' threshold. Lattice map 103a, image-based bitmap 204 and motion vector-based bitmap 402 enter map combiner with counters 430. Combiner 430 generates two counts, count 406 and count 407, and a combined bitmap 408, which will be described below with respect to FIG. 5. Motion vector component 108a is input to stage 410, where an absolute value 403 of motion vector component 108a is computed. Absolute value 403 is compared to a threshold 404 at comparator 425 and a binary map 405 generated, which is sent to outlier detector 450. Binary map 405 indicates which blocks have a low motion value, meaning that the absolute value of motion vector component 108a is below threshold 404. Lattice map 103a, counts 406 and 407, along with binary map 405 are sent to outlier detector 450, which will be described below with respect to FIG. 6. Combined bitmap 408 is sent to an M×N local mean calculator 440. M×N local mean calculator 440 uses bitmap 408 to only consider motion vectors 108a belonging to a homogenous region for the mean calculation. Although the window is M×N in size, the number of samples involved in the mean calculation may vary between 1 and M×N samples. Mean value 415 is a replacement motion vector component value that may be used in some embodiments of the present invention when an outlier is detected by outlier detection block 450, as indicated by binary map 409. The decision whether or not to use mean value 415 as a replacement vector or keep motion vector component 108a is determined by deciding stage 460 based on the value provided by binary bitmap 409. If no outliers are detected, motion vectors in 108a are left unchanged. Output motion vector component 109a is the filtered version of input motion vector component 108a and is ready to be used along with the other filtered motion vector components.

Figure 5:
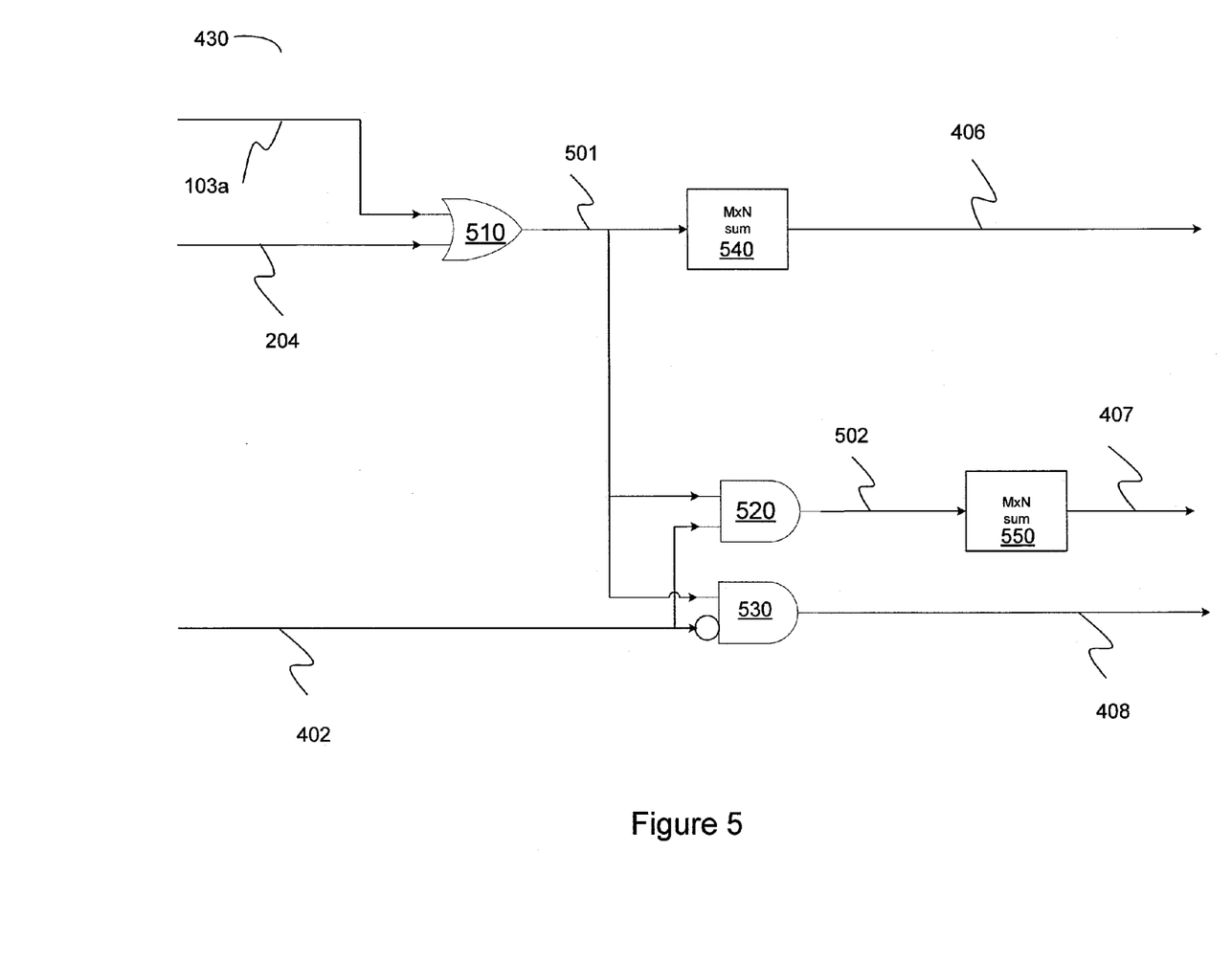
FIG. 5 illustrates a block diagram of a map combiner, consistent with some embodiments of the present invention.

FIG. 5 illustrates a block diagram of map combiner 430, according to some embodiments of the present invention. Each bit of M×N image-based bitmap 204 generated by shape-adaptive generator 230 is provided to a group of M×N 'OR' gates 510, to which lattice map 103a is input from lattice detector 120 (cf. FIG. 1). The purpose of the M×N 'OR' gates 510 is to make sure that a lattice structure present in image 101 or in delayed image 102 is not segmented into multiple objects. For example, a picket fence could be segmented into a series of individual pickets and individual gaps between the pickets, which would eventually lead to spurious motion vector components.

By knowing that the fence is a lattice object, the entire fence may be considered a single object that may stand still, avoiding the erroneous assumption of motion of individual components of the fence. The modified image-based bitmap 501 is then sent to M×N sum 540, which provides a count of homogeneous pixels 406 within an M×N window. Pixel count 406 may be referred to as an 'image segment' pixel count. Bitmap 501 is also provided to two groups of 'AND' gates, 520 and 'AND NOT' gates 530, along with motion vector-based bitmap 402, generated by shape-adaptive window generator 420 (cf. FIG. 4). The first group of 'AND' gates 520 determines the intersection between the image-based homogeneous region and the motion vector-based homogenous region. In some embodiments of the present invention, this may be segmentation within a segment. In some embodiments of the present invention, multiple regions may have the same motion, in which case the combined bitmap 502 may be similar to image-based bitmap 501. In some embodiments of the present invention, lattice regions may induce the appearance of erroneous motion vectors, in which case combined bitmap 502 will be similar to motion vector-based bitmap 402. Combined bitmap 502 is sent to M×N sum 550, which provides pixel count 407 of this more restricted homogeneous region. Pixel count 407 may be referred to as an 'image/motion segment' pixel count. In some embodiments of the present invention, image/motion segment pixel count 407 may be smaller than, or equal to, image segment pixel count 406. The group of 'AND NOT' gates 530 assumes that an outlier motion vector is present at the center of M×N window 204 and that all motion vectors that are not similar to the center motion vector should be used to determine a replacement motion vector component value to remove the outlier. According to some embodiments of the present invention disclosed in FIG. 5, combined bitmap 408 excludes isolated motion vectors within a uniform region—such as a lattice structure or a flat area—from being considered by local mean calculator 440 (cf. FIG. 4).

Figure 6:
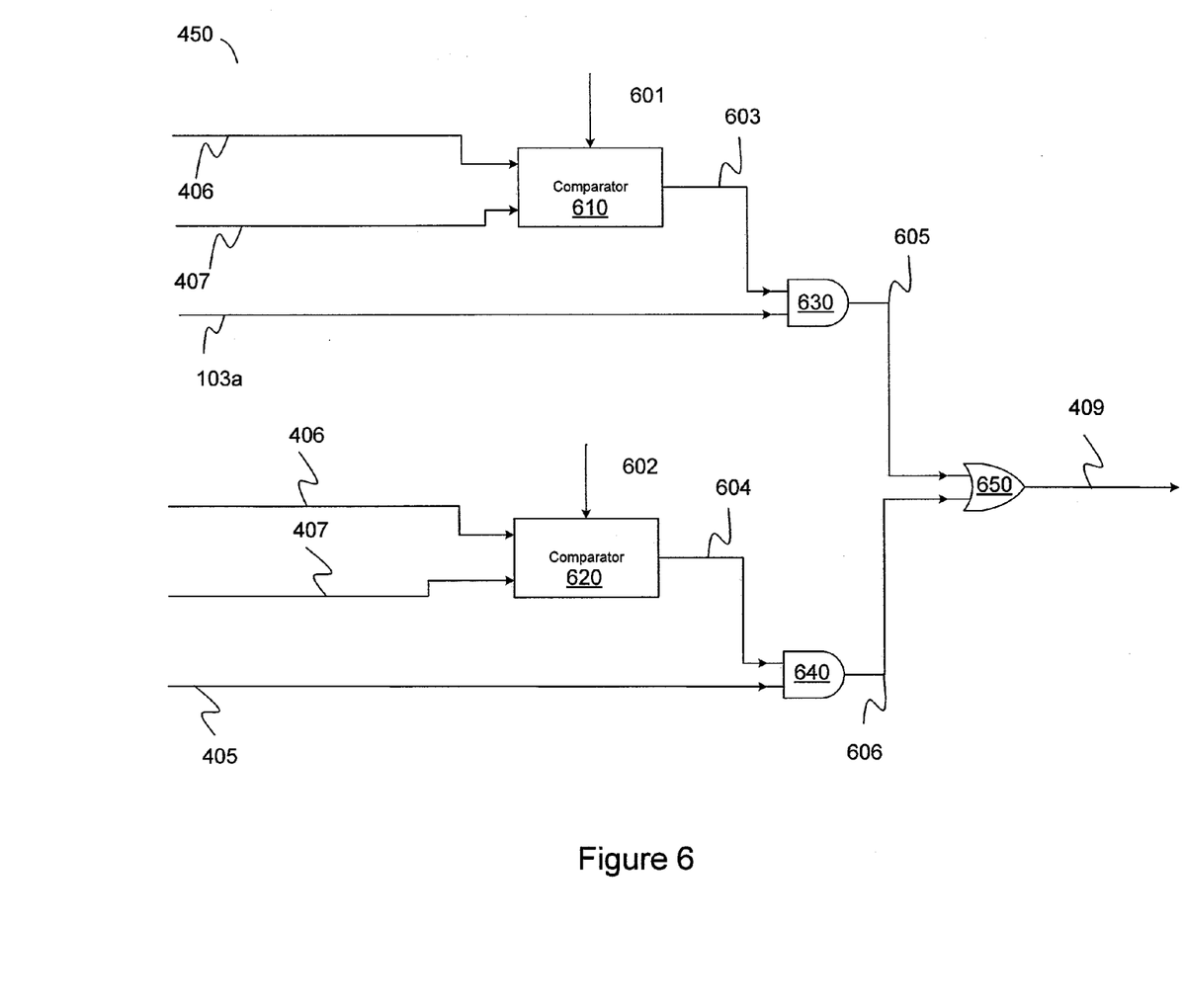
FIG. 6 illustrates a block diagram of an outlier detector, consistent with some embodiments of the present invention.

FIG. 6 illustrates a block diagram of outlier detector 450 (cf. FIG. 4). The purpose of outlier detector 450 is to determine whether an input motion vector component should be replaced by a local mean value, which excludes outliers from the calculation, or left unchanged. Image segment pixel count 406 and image/motion segment pixel count 407 are compared for two different scenarios at comparators 610 and 620. The first scenario is when lattice map 103*a* indicates a lattice structure in the area. For this case the comparison is relative and lattice structure threshold 601 is used in comparator 610. Relative comparison means that the ratio of image/motion segment pixel count 407 over image segment pixel count 406 is below a lattice structure threshold value, indicating an outlier 603 for this scenario. The first scenario is acknowledged by bit 605, provided through 'AND' gate 630. The second scenario is when binary map 405 indicates a presence of "high-enough" motion in the area (cf. FIG. 4). In this case the comparison is still relative, but an even smaller threshold 602 is used in comparator 620. Threshold 602 may be referred to as 'high-motion threshold'. The second scenario is registered by bit 606, provided by 'AND' gate 640.

According to some embodiments of the present invention, in the lattice structure scenario outliers are detected more easily and need not be isolated, as opposed to the high-motion scenario. When none of these two scenarios is involved, that is, when bits 605 and 606 are both '0', then binary map 409 is assigned a '0' by 'OR' gate 650, outliers are not detected, and input motion vector components are left unchanged.

In conclusion, by using a down sampled version of the original input image as well as lattice maps as guides, it is possible to filter motion vector components at different levels. The different levels of filtering may depend on the location of different object boundaries, the presence of lattice structures, and the amount of motion already associated to any object. This 'blind' method has a cost-effective implementation, is independent from the motion estimator's architecture, and is carefully guided to yield reliable results.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A method of filtering a motion vector field provided by a motion estimation apparatus, comprising:
    receiving an input image and a delayed image;
    determining a motion vector field associated with the input image;
    determining a local segmentation image;
    forming a lattice map to identify periodic structures in the input image and the delayed image;
    obtaining an image segment pixel count and an image/motion segment pixel count using the local segmentation image and the lattice map;
    detecting outliers in the motion vector field using the lattice map, the image segment pixel count and the image/motion segment pixel count; and
    replacing detected outliers in the motion vector field with a local mean value of motion vectors surrounding the detected outliers.

2. The method of claim 1, wherein the motion estimation apparatus is part of a computer, further comprising a set of commands to be executed by a processing unit to perform operations on data structures stored in a memory.

3. The method of claim 1, wherein the motion estimation apparatus comprises a processor circuit controlled by firmware.

4. The method of claim 1, wherein the motion estimation apparatus comprises a dedicated circuit designed for performing a task involved in providing a filtered motion vector field.

5. The method of claim 1, wherein the motion estimation apparatus comprises a combination of a computer having a memory and a processing unit, a processor circuit controlled by firmware, and a dedicated circuit specifically designed for performing a task involved in providing a set of filtered motion vectors.

6. The method of claim 1, further wherein determining a local segmentation image comprises low-pass filtering and down-sampling the input image, and applying a shape-adaptive window to the resulting image.

7. The method of claim 6 wherein applying the shape-adaptive window to the input image comprises generating an image bitmap array of homogeneous illumination pixels.

8. The method of claim 7, further comprising:
    applying a shape adaptive window to the motion vector field; and
    providing an outlier indicator and a binary map from the detected outliers.

9. The method of claim 8 wherein applying a shape adaptive window to the motion vector field comprises generating a motion bitmap array of homogeneous motion pixels.

10. The method of claim 1 wherein detecting an outlier in the motion vector field comprises combining the lattice map and the outlier indicator using an AND gate.

11. The method of claim 8 wherein the outlier indicator is obtained by comparing the image segment pixel count and the image/motion segment pixel count to a threshold value.

12. The method of claim 8 wherein the binary map indicates low motion value and high motion value.

13. The method of claim 9 wherein the generating an image bitmap array and a motion bitmap array comprises using an image segmentation threshold and a motion segmentation threshold.

14. The method of claim 13 wherein the image segment pixel count and the image/motion segment pixel count are obtained by using the image bitmap array, the motion bitmap array, and the lattice map.

15. The method of claim 1 wherein
    the local mean value of motion vectors surrounding the detected outliers is obtained using a combined bitmap and a motion vector field; further wherein
    the combined bitmap excludes isolated motion vectors within a uniform region.

16. The method of claim 15 wherein the local mean value of motion vectors surrounding the detected outliers replaces the actual value of the motion vector field only when the actual value of the motion vector field is an outlier value.

17. The method of claim 8 wherein detecting an outlier in the motion vector field using the lattice map, the image segment pixel count, and the image/motion segment pixel count further comprises:
  using a relative comparison between the image/motion segment pixel count and the image segment pixel count; and
  obtaining a lattice structure threshold and a high-motion threshold;
  determining one of two scenarios for an outlier motion vector value by comparing the relative comparison between the image/motion segment pixel count and the image segment pixel count to the lattice structure threshold and the high-motion threshold;
  generating the binary map by assigning a 1 when at least one of the lattice structure threshold and the high-motion threshold is lower than the relative comparison between the motion segment pixel count and the image segment pixel count, and assigning a 0 otherwise.

18. The method of claim 1 wherein filtering the motion vector field is done separately for two components of the motion vector field, the two components being substantially orthogonal to one another.

19. An apparatus for filtering a motion vector field provided by a motion estimation apparatus, comprising:
  a low pass filter and down-sampler to provide a local segmentation image from the input image;
  a first shape adaptive window generator to provide an image bitmap from the local segmentation image;
  a map combiner to provide an image segment pixel count and an image/motion segment pixel count using the image bitmap and a lattice map;
  a second shape adaptive window generator to provide a motion vector based bitmap;
  an outlier detector to provide a binary map for detecting outliers in the motion vector field using the lattice map, the image segment pixel count and the image/motion segment pixel count;
  a local mean calculator to provide a local mean value of motion vectors surrounding a motion vector to replace the motion vector; and
  a deciding stage to determine whether or not to replace the motion vector with the local mean value using the binary map.

20. A motion estimation apparatus comprising:
  an image delay apparatus to provide a delayed image from an input image;
  a lattice detector to find lattice structures in the input image and the delayed image and provide a lattice map;
  a histogram generator and a histogram analyzer to provide a set of horizontal and vertical search masks;
  a motion vector estimator to provide a motion vector field based on the input image, the delayed image, the lattice structures and a masked motion vector field based in the horizontal and vertical search masks; and
  a motion vector filter further comprising:
    a low pass filter and down-sampler to provide a local segmentation image from the input image;
    a first shape adaptive window generator to provide an image bitmap from the local segmentation image;
    a map combiner to provide an image segment pixel count and a motion/image segment pixel count using the image bitmap and the lattice map;
    a second shape adaptive window generator to provide a motion vector based bitmap;
    an outlier detector to provide a binary map for detecting outliers in the motion vector field using the lattice map, the image segment pixel count and the image/motion segment pixel count;
    a local mean calculator to provide a local mean value of motion vectors surrounding a motion vector to replace the motion vector; and
    a deciding stage to determine whether or not to replace the motion vector with the local mean value using the binary map.

21. The apparatus of claim 20 wherein the histogram generator counts the number of motion vectors having a particular displacement corresponding to a given lattice pitch.

22. The apparatus of claim 20 further comprising a motion vector selector that provides selected motion vector components from the motion vector field using period information from the lattice map to select between the motion vector field and the masked motion vector field.

23. The apparatus of claim 20, wherein the lattice detector comprises:
  a weighting unit configured to receive pixel samples from the input image and the delayed image and weight the received pixel samples;
  a Fast Fourier Transform (FFT) unit configured to perform a Fourier transform on the weighted pixel samples to obtain transform coefficients;
  a peak and period compensation unit configured to detect a strongest frequency amplitude of peaks of the obtained transform coefficients and convert the detected strongest frequency amplitude of peaks into a pitch period map; and
  a filter period unit configured to generate the lattice map from the pitch period map.

* * * * *